(12) United States Patent
Yokota et al.

(10) Patent No.: US 7,518,983 B2
(45) Date of Patent: Apr. 14, 2009

(54) PROXY RESPONSE APPARATUS

(75) Inventors: Daisuke Yokota, Yokohama (JP); Fumio Noda, Kodaira (JP)

(73) Assignee: Hitachi, Ltd., Tokyo (JP)

( * ) Notice: Subject to any disclaimer, the term of this patent is extended or adjusted under 35 U.S.C. 154(b) by 943 days.

(21) Appl. No.: 10/703,824

(22) Filed: Nov. 7, 2003

(65) Prior Publication Data
US 2004/0221207 A1 Nov. 4, 2004

(30) Foreign Application Priority Data
Mar. 19, 2003 (JP) ............... 2003-074803

(51) Int. Cl.
*G06F 11/00* (2006.01)
(52) U.S. Cl. ............... 370/216; 370/217; 370/218; 370/220
(58) Field of Classification Search ........... 370/216, 370/217, 218, 219, 220
See application file for complete search history.

(56) References Cited

U.S. PATENT DOCUMENTS

| 6,108,300 | A * | 8/2000 | Coile et al. ............. 370/217 |
| 6,266,335 | B1 * | 7/2001 | Bhaskaran ............. 370/399 |
| 6,874,031 | B2 * | 3/2005 | Corbeil ............. 709/229 |
| 2003/0014480 | A1 * | 1/2003 | Pullara et al. ............. 709/203 |
| 2003/0028515 | A1 | 2/2003 | Nishikado et al. ............. 701/1 |
| 2003/0058839 | A1 * | 3/2003 | D'Souza ............. 370/352 |
| 2004/0054712 | A1 * | 3/2004 | Andreev et al. ............. 709/202 |
| 2005/0102427 | A1 * | 5/2005 | Yokota et al. ............. 709/245 |

FOREIGN PATENT DOCUMENTS

| JP | 05-316116 | 11/1993 |
| JP | 11-068837 | 3/1999 |

* cited by examiner

*Primary Examiner*—Chi H Pham
*Assistant Examiner*—Farah Faroul
(74) *Attorney, Agent, or Firm*—Hogan & Hartson LLP

(57) ABSTRACT

A proxy response apparatus is equipped with a module that obtains and retains request messages and response messages exchanged between a client and main and backup servers, a module for detecting a failure in the main server, a module for sending to the backup server requests retained when a failure occurs in the main server, a module for receiving responses from the backup server, a module for detecting communications status between the client and the main server at the time the failure occurred, and a module for responding in place of the main server in order to resume communicating state from the previous state.

21 Claims, 8 Drawing Sheets

| Session Identifier (111) | Client Address (112) | Server Address (113) | Client Transmission Packet Buffer (114) | Server Transmission Packet Buffer (115) | |
|---|---|---|---|---|---|
| 1 | | | Packet  Packet | Packet | 110-1 |
| 2 | | | | | 110-2 |
| 3 | | | | | 110-3 |
| ⋮ | | | ⋮ | ⋮ | |

Fig. 4

| Monitoring Target Server Address (121) | Backup Server Address (122) | |
|---|---|---|
| | | 120-1 |
| | | 120-2 |
| | | 120-3 |
| ⋮ | ⋮ | |

Fig. 11

PROXY RESPONSE APPARATUS

The basic foreign Application filed on Mar. 19, 2003, No. 2003-074803 in Japan is hereby incorporated by reference.

BACKGROUND OF THE INVENTION

1. Field of the Invention

The present invention relates to a client/server type system, in which economical scalability and system availability are possible.

2. Related Background Art

With advances in computers and networks, there has been a growth in the application range of client/server type systems, in which clients send messages to a server and the server responds to the clients with processing results as messages, and improving the availability of the systems has become increasingly important. At the same time, an economical scalability that can increase or decrease the processing capability of a server according to request volumes from clients is also sought to minimize system costs.

Among methods to improve the availability of client/server type systems, for example, a master/slave method is known. According to the master/slave method, a client is connected to a plurality of servers (for example, a and b) via a communications network, such as an IP network, for example. Each of the servers a and b shares information required to respond to requests from the client and has a synchronization section for detecting occurrences of failures in each other.

According to this method, the server a that responds to requests from the client and the server b as a backup are provided; in the event of a failure in the server a, the server b detects the failure and responds to the client in place of the server a. The client and the servers a and b retain their respective messages until the transmission destinations definitely receive the messages. Through this, according to this method, as long as both the servers a and b do not fail simultaneously, one of the servers a and b can respond to requests from the client.

Due to the fact that the server b is always necessary as a backup for the server a according to the above method, the method cannot be said to have economical scalability, although the number of backup servers may be reduced by an appropriate technology.

Another method for improving availability is a cluster method. The cluster method may be used with a system that comprises, for example, a client, servers a and b and load distributing apparatuses a and b, all connected to each other via an IP network. The servers a and b according to this method do not have synchronization sections. Each of the load distributing apparatuses a and b has a function to detect occurrences of failures in each other and to continue processing in the place of the other in the event of a failure, a function to detect occurrences of failures in the servers a and b, a function to relay messages from the client to one of the servers without any failure, and a function to relay messages from one of the servers to the client. In the event a failure occurs in the server a according to the above method, either the load distributing apparatus a or b relays subsequent messages from the client to the server b, in which failure has not occurred. Furthermore, the client and the servers a and b retain messages until the transmission destinations definitely receive the messages, and resend their respective messages in the event of failed reception. Although there are only two servers, the servers a and b, according to this example, there may be three or more. As a result, according to this method, as long as both the servers a and b do not fail simultaneously, one of the servers a and b can respond to requests from the clients.

The above method can increase or decrease the processing capability of the system by increasing or decreasing the number of servers, and therefore has economical scalability.

The cluster method has economical scalability and has enough availability, even when a failure occurs in a server, to respond to requests from clients subsequent to an occurrence of failure.

However, the above methods lack availability in that requests from clients whose reception was completed by a server before the server failed cannot be responded to, due to the fact that such request messages are lost as a result of the server's failure.

SUMMARY OF THE INVENTION

The present invention relates to a proxy response apparatus that provides availability to a cluster method system.

A proxy response apparatus in accordance with an embodiment of the present invention has a module for storing addresses of monitoring target servers to be monitored that are monitored by the proxy response apparatus for occurrences of failures and of backup servers that can respond in place of the monitoring target servers, and for obtaining from a communication network messages sent and received by the monitoring target servers; a module for detecting failures in the monitoring target servers; a module, in the event a failure is detected in one of the monitoring target servers, for rewriting transmission source address for messages not responded to among request messages from a client obtained to an address of the proxy response apparatus, and for sending the messages to one of the backup servers; and a module for rewriting transmission source addresses for response messages from the backup server to the address of the monitoring target service and for relaying the messages to the client.

As a result, when servers a and b are monitoring target servers and are also backup servers for each other, in the event a failure occurs in the server a after it receives a request message, the request message from the client that would have been lost is instead sent to the backup server b by the proxy response apparatus, since the proxy response apparatus received the request message in advance from the communications network; and the request from the client can be responded to by relaying a response from the backup server b to the client.

Other features and advantages of the invention will be apparent from the following detailed description, taken in conjunction with the accompanying drawings that illustrate, by way of example, various features of embodiments of the invention.

DESCRIPTION OF THE PREFERRED EMBODIMENT

An embodiment example of the present invention is described below with references to the accompanying drawings.

Figure 1:
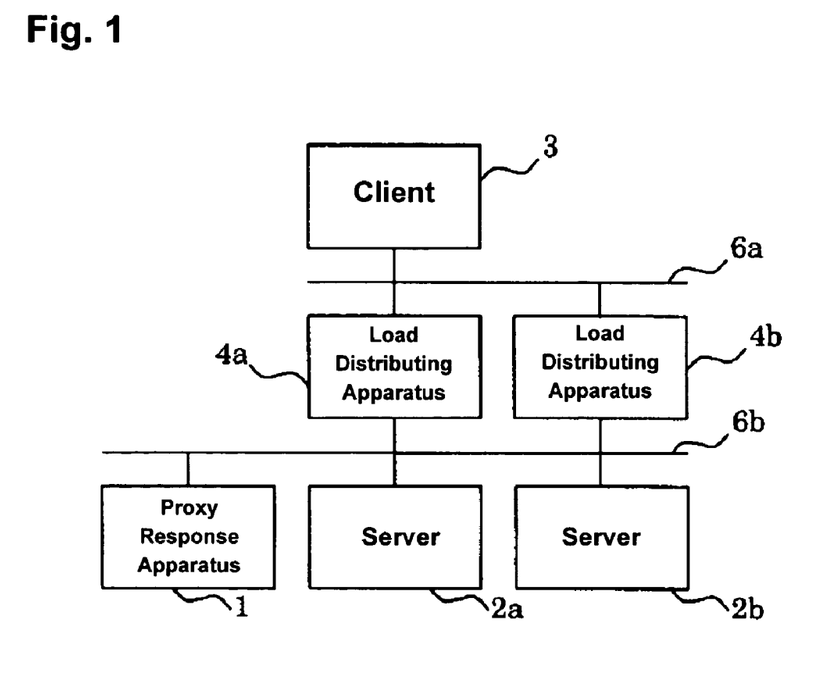
FIG. 1 shows a diagram of one configuration of a network system using a proxy response apparatus in accordance with an embodiment of the present invention.

FIG. 1 is the overall configuration of a network system to which a proxy response apparatus according to the present embodiment example is applied.

A client terminal (hereinafter called "client") 3 is connected to load distributing apparatuses 4a and 4b via a communications network (hereinafter called "IP network") 6a such as the Internet. The load distributing apparatus 4a is connected to server apparatuses (hereinafter called "servers") 2a and 2b and a proxy response apparatus 1 via an IP network 6b. The load distributing apparatus 4b is a backup for the load distributing apparatus 4a and, in the event a failure occurs in the load distributing apparatus 4a, continues processing in place of the load distributing apparatus 4a.

Messages that are exchanged between the client 3 and the servers 2a and 2b are sent and received using IP packets. Messages are divided into a plurality of IP packets as necessary and sent and received. The IP packets sent from the client 3 arrive at the load distributing apparatus 4a via the IP network 6a. The load distributing apparatus 4a distributes the IP packets from the client 3 to either the server 2a or the server 2b, depending on the load on the servers. Furthermore, the load distributing apparatus 4a has a function to distribute a plurality of IP packets that form a single message to one server. The number of servers may be three or more.

The proxy response apparatus 1 is connected to the IP network 6b and can obtain all IP packets that flow into the IP network 6b.

Figure 2:
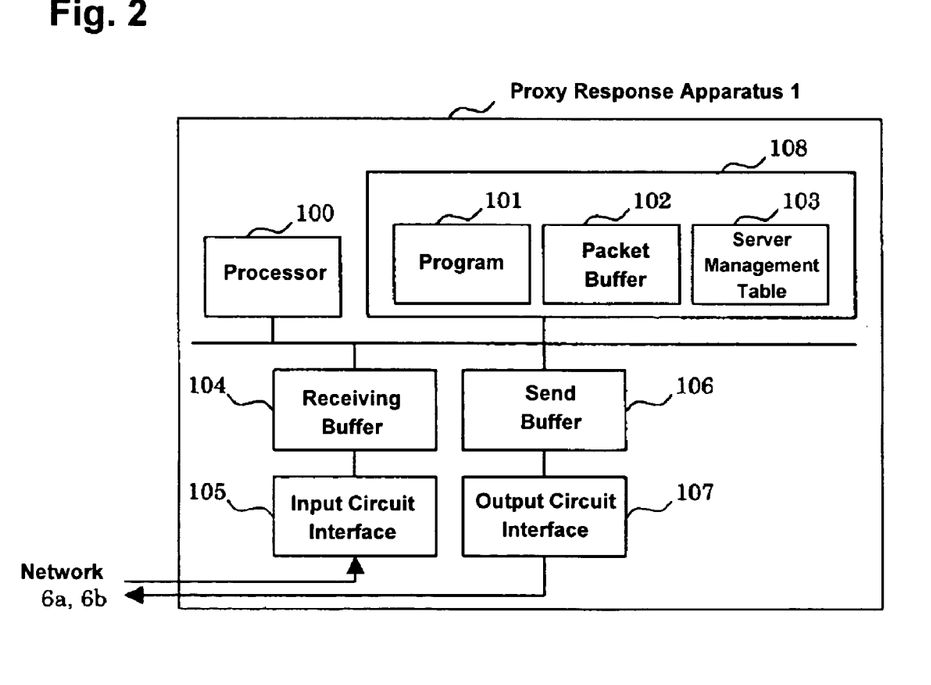
FIG. 2 shows an example of a configuration of a proxy response apparatus.

FIG. 2 is the hardware configuration of an information processing apparatus that realizes the proxy response apparatus 1. The information processing apparatus that realizes the proxy response apparatus 1 comprises a processor 100, a storage apparatus 108, an input circuit interface 105 and an output circuit interface 107 for connecting with the IP network 6b, a receiving buffer 104 for temporarily accumulating IP packets received by the input circuit interface 105, a send buffer 106 for temporarily accumulating IP packets to be sent through the output circuit interface 107, and private communications lines such as buses for connecting the various elements to each other. The storage apparatus 108 stores a program memory 101, a packet buffer 102 and a server management table 103. The program memory 101 stores various control programs that are executed by the processor 100 and that realize the proxy response apparatus 1. The packet buffer 102 accumulates IP packets exchanged between the client 3 and the servers 2a and 2b. The storage apparatus 108 is formed by a semiconductor storage apparatus or an external storage apparatus, such as hard disks.

The programs can be stored in the storage apparatus 108 in advance or can be loaded onto the storage apparatus 108 via a detachable storage medium or a communications medium (i.e., a network or a carrier wave that carries it), not shown.

The proxy response apparatus 1 is provided with input devices and a display device to enable a system administrator to input data, but they are not shown in FIG. 2 since they are not used in the description below.

The proxy response apparatus 1 has the packet buffer 102 for managing messages exchanged between the client 3 and the servers 2a and 2b, and manages each request message sent by the client 3 and the corresponding response message from the server 2a or 2b as one unit (hereinafter called a "session"). Sessions are registered as session management entries 110-1, 110-2, etc. in the packet buffer 102.

Figure 3:
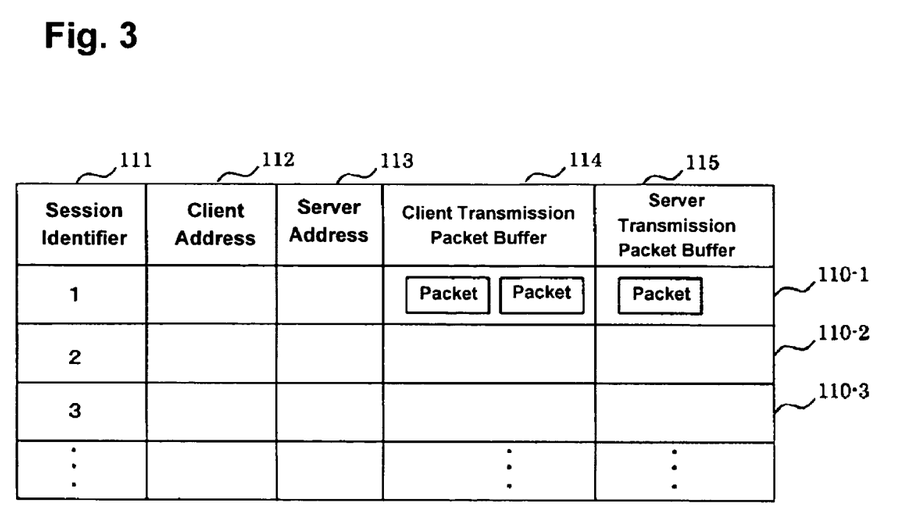
FIG. 3 shows an embodiment example of a packet buffer of the proxy response apparatus.

FIG. 3 is an example of the configuration of the packet buffer 102.

Each entry in the packet buffer 102 comprises a session identifier 111, a client address 112, a server address 113, a client transmission packet buffer 114, and a server transmission packet buffer 115.

A unique identifier is provided in the session identifier 111 to identify each entry. An IP address of the client 3 that sent a request is set in the client address 112. An IP address of a server, for example, the server 2a that received the request is set in the server address 113. All IP packets sent by the client 3 to the server 2a are stored in the client transmission packet buffer 114. All IP packets sent from the server 2a to the client 3 are stored in the server transmission packet buffer 115.

Figure 4:
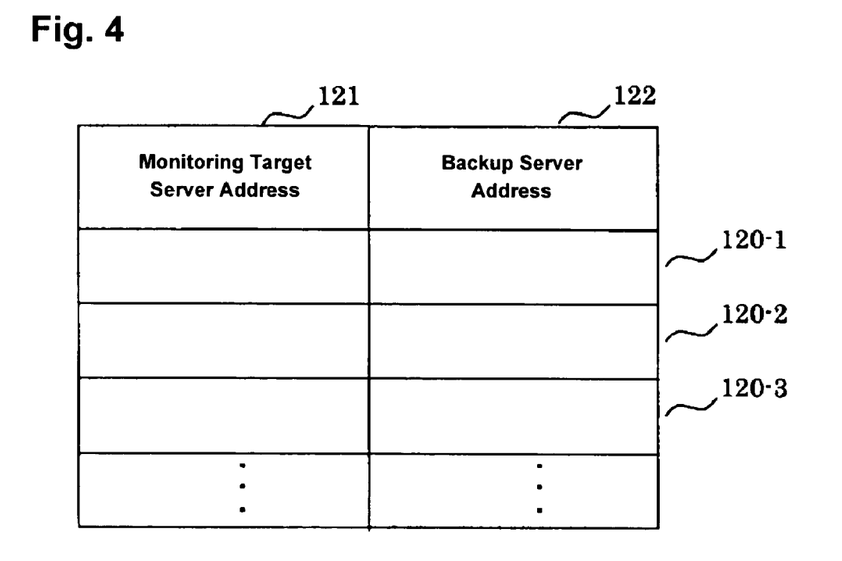
FIG. 4 shows an embodiment example of a server management table 103 of the proxy response apparatus.

FIG. 4 is an example of the configuration of the server management table 103 of the proxy response apparatus 1. The server management table 103 manages the IP addresses of the servers 2a and 2b to be monitored by the proxy response apparatus 1, as well as the IP address of the backup server that can perform processing in the event a failure occurs in the main server in each entry. Each of entries 120-1, 120-2, etc. in the server management table 103 comprises a monitoring target server address 121 and a backup server address 122.

Figure 5:
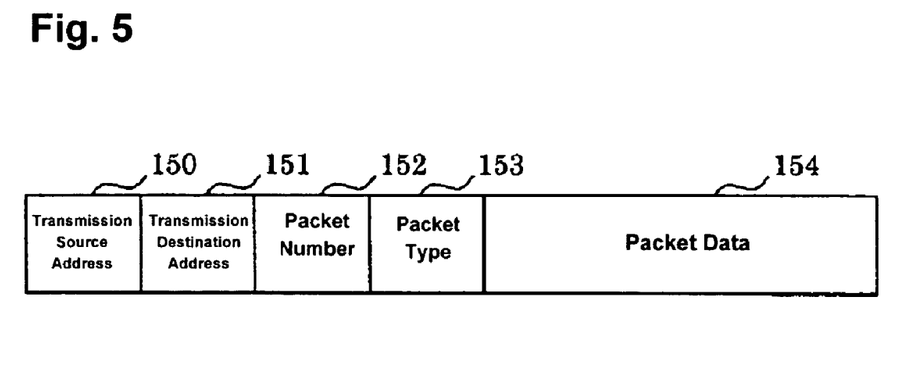
FIG. 5 shows an example of the packet format sent and received between a client and a server.

FIG. 5 is an overview of IP packets processed by the proxy response apparatus 1. Each IP packet comprises a transmission source address 150, a transmission destination address 151, a packet number 152, a packet type 153 and packet data 154. For example, an IP packet sent from the client 3 to the server 2a would have the IP address of the client 3 set in the transmission source address 150 and the IP address of the server 2a in the transmission destination address 151. In the packet number 152, 1 is assigned to the first IP packet, 2 to the second, 3 to the third, etc., such that a numerical value indicating the order sent is set. The type of the IP packet is set in the packet type 153. The IP packet type can be a connection request, a data transmission, a disconnection request, or a reception response. Data to be sent is stored in the packet data 154.

Figure 6:
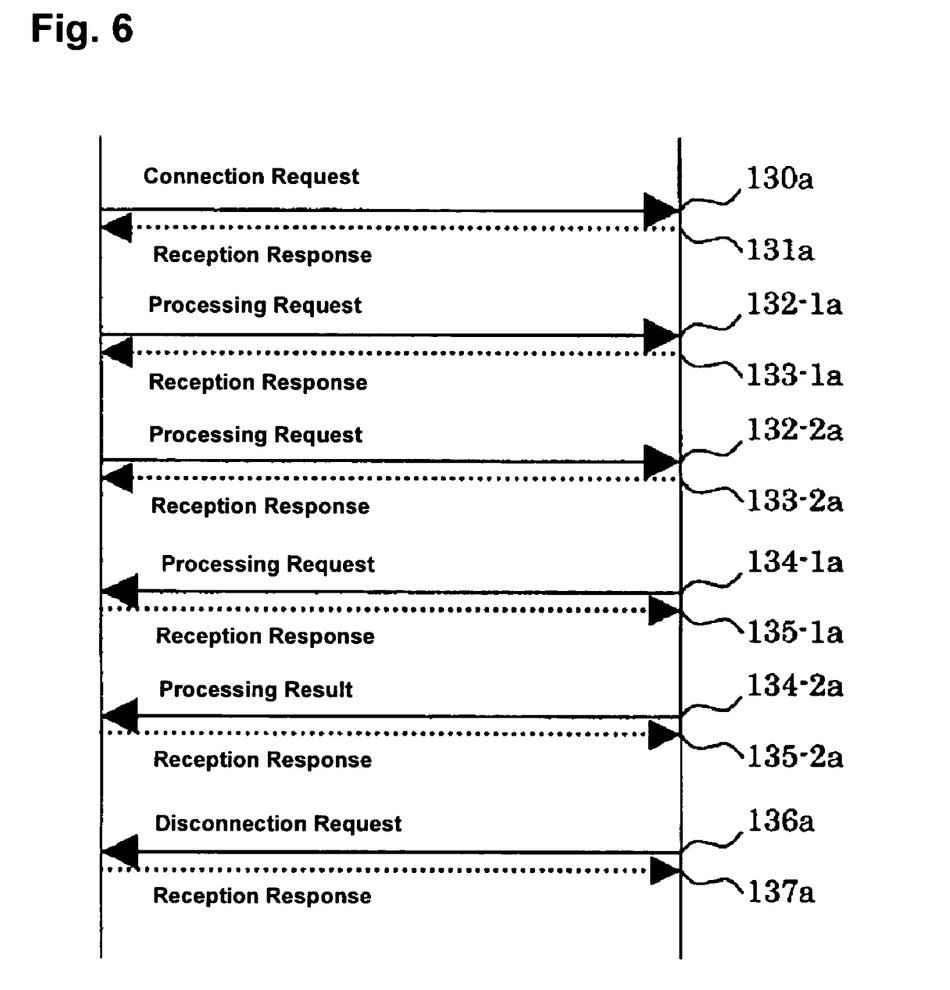
FIG. 6 shows a message flow when IP packets are normally sent and received between a client and a server.

FIG. 6 is a diagram of an example of a message flow in a session, in which the client 3 sends a request message to the server 2a and the server 2a responds to the message with a response message. Each arrow indicates a transmission of one IP packet that makes up a message.

The client 3 sends a connection request 130a to the server 2a before sending a request message. The server 2a sends a reception response 131a to the client 3 to indicate that it received the connection request 130a. Subsequent reception responses 133-1a, 133-2a, 135-1a, 135-2a and 137a similarly correspond to processing requests 132-1a and 132-2a, processing results 134-1a and 134-2a, and a disconnection request 136*a*, respectively. In the packet type 153 of packets that comprise each reception response is set "reception response," and in the packet number 152 is set a packet number that corresponds to the number assigned to the packet in order to indicate which packet was received.

Next, the client 3 sends a request message in more than one packet, for example two IP packets (the processing requests 132-1*a* and 132-2*a*) to the server 2*a*.

Corresponding to the request message, the server 2*a* sends a response message in more than one packet, for example two IP packets (the processing results 134-1*a* and 134-2*a*), to the client 3. Although the processing requests 132-1*a* and 132-2*a* and the processing results 134-1*a* and 134-2*a* are called "the processing requests" and "the processing results" to simplify the explanation, the packet type 153 for each of these IP packets is data transfer.

Next, when the server 2*a* sends the disconnection request 136*a* to the client 3, one session ends normally. Alternatively, the client 3 may send a disconnection request.

At this point, both the client 3 and the server 2*a* retain their respective IP packets until a reception response for each IP packet sent is received; if a reception response is not received, the corresponding IP packet is resent. As a result, even if a temporary failure were to occur in the IP network 6*a* or 6*b* or the load distributing apparatus 4*a* or 4*b* between the client 3 and the server 2*a*, the IP packets can be sent and received properly after a recovery from the failure.

The following is a description of the operation of the proxy response apparatus 1. The proxy response apparatus 1 responds in place of the server 2*a* in the event a failure occurs in the server 2*a* and thereby allows the flow described in FIG. 6 to end properly.

Figure 7:
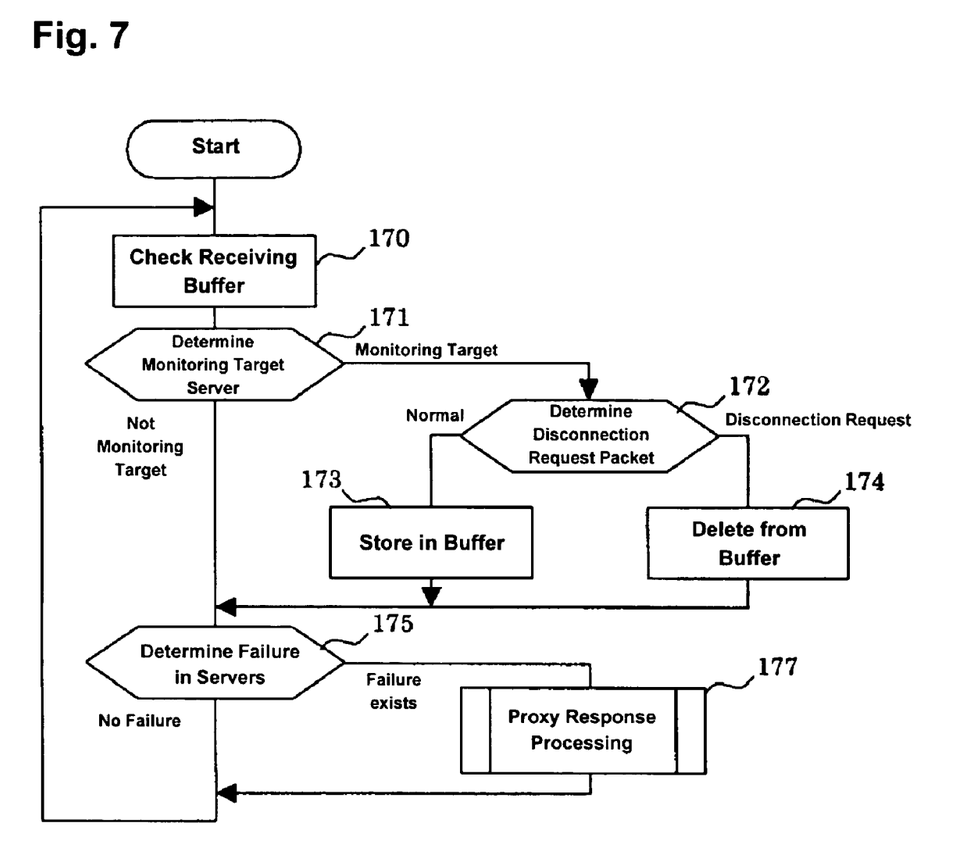
FIG. 7 shows a flowchart in part of a processing executed by the proxy response apparatus in accordance with an embodiment of the present invention.

FIG. 7 is a flowchart of an example of the operation of the proxy response apparatus 1; the flowchart is described as the operation of the processor 100.

All IP packets that flow into the IP network 6*b*, to which the proxy response apparatus 1 is connected, are obtained by the input circuit interface 105 and stored in the receiving buffer 104.

If there are any IP packets in the receiving buffer 104, the processor 100 obtains one of the IP packets (step 170), and determines whether the IP packet obtained concerns the server 2*a*, which is a monitoring target, based on whether the transmission source address 150 or the transmission destination address 151 of the IP packet matches the monitoring target server address 121 in the server management table 103. If no IP packet is obtained from the receiving buffer 104 in step 170, the processing proceeds to step 175 (step 171).

If there is a match, the processor 100 determines whether the packet type 153 of the IP packet is a disconnection request (step 172); if the packet type 153 is not a disconnection request, the processor 100 stores the IP packet in an applicable entry of the packet buffer 102 (step 173). The applicable entry is determined based on a match between a set of the transmission source address 150 and the transmission destination address 151 of the IP packet and a set of the client address 112 and the server address 113 (a match may be recognized even if components of the sets are in different order). If the transmission destination of the IP packet is the server 2*a*, the packet is stored in the client transmission packet buffer 114; if the transmission source of the IP packet is the server 2*a*, the packet is stored in the server transmission packet buffer 115. If there is no applicable entry, a new entry is created.

If the packet type 153 is found in step 172 to be a disconnection request, the applicable entry is deleted (step 174).

The processor 100 determines whether there is any failure in servers whose addresses appear in the monitoring target server addresses 121 for the entries in the server management table 103 (step 175). If there is a failure, the processor 100 executes a proxy response processing (step 177). Any one of appropriate methods can be used for determining whether there is a failure in servers. One example of such a method would be to monitor all sessions stored in the packet buffer 102 and to determine that a failure has occurred in a server if there is no response from the server for a certain amount of time in the corresponding session. Another example would be to execute a program on a server that continuously sends to the proxy response apparatus 1 a message signifying that there is no failure in the server, and to determine that a failure has occurred in the server if the proxy response apparatus 1 is unable to receive the message.

When performing a proxy response processing for the first time in a session, all IP packets received are used to execute the processing up to the point at which the failure occurred, in order to reproduce the same condition.

Step 177 is executed for each IP packet and the processor 100 returns to step 170 after executing step 177.

Figure 8:
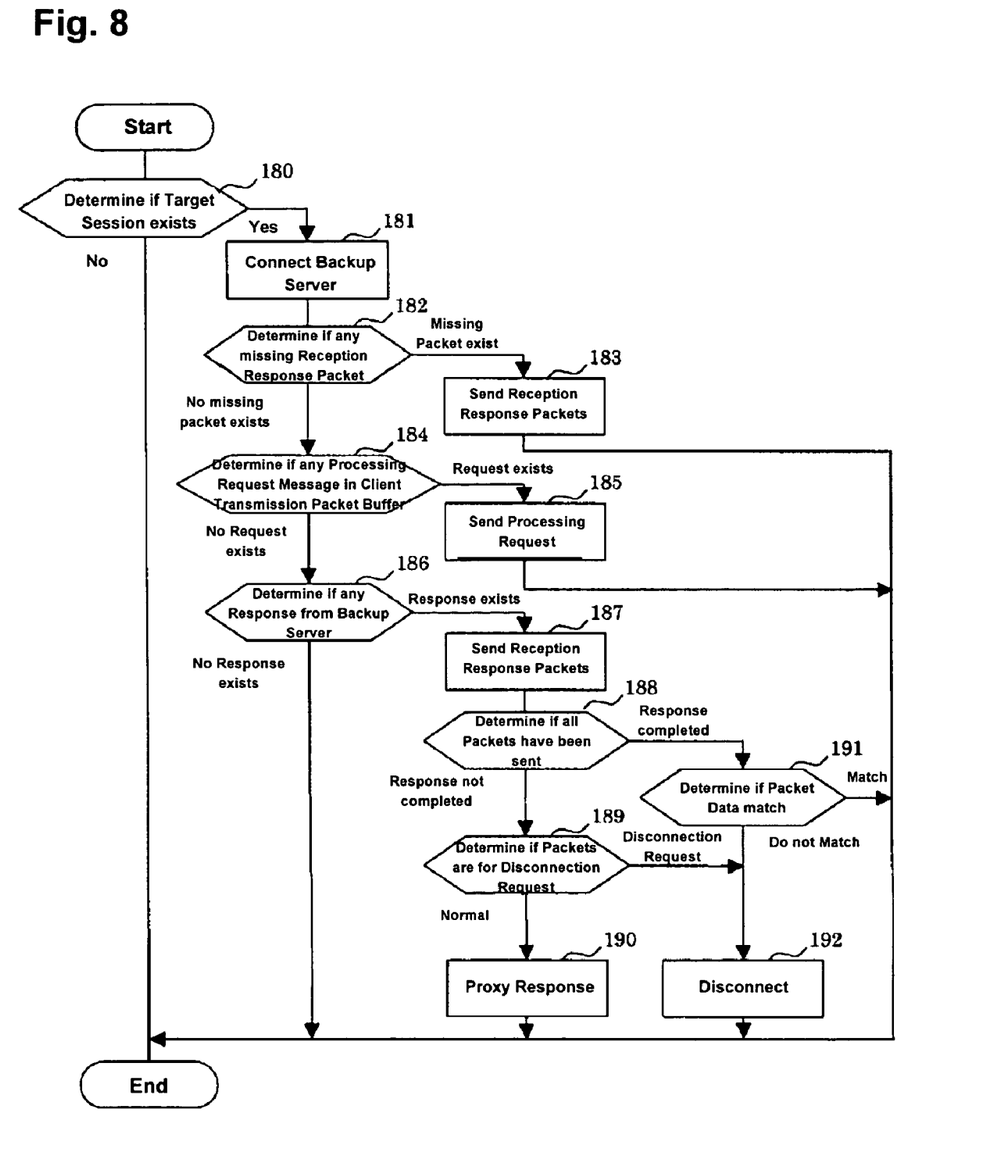
FIG. 8 shows a flowchart in part of a proxy response processing executed by the proxy response apparatus in accordance with an embodiment of the present invention.

Referring to FIG. 8, one embodiment example of the operation of the proxy response processing (step 177) is described in detail. The processing in FIG. 8 is also executed for each IP packet and the processing returns to step 170 in FIG. 7 after the processing is executed.

The following is a description of two failure examples: the first failure example in which a failure occurs in the server 2*a* when the client 3 sends the connection request 130*a* and the processing requests 132-1*a* and 132-2*a* to the server 2*a*, and the second failure example in which a failure occurs in the server 2*a* when the server 2*a* sends the processing results 134-1*a* and 134-2*a* and the disconnection request 136*a* to the client 3; the operation of the proxy response apparatus 1 in each case is described below. The two failure examples covers all possible situations.

Figure 9:
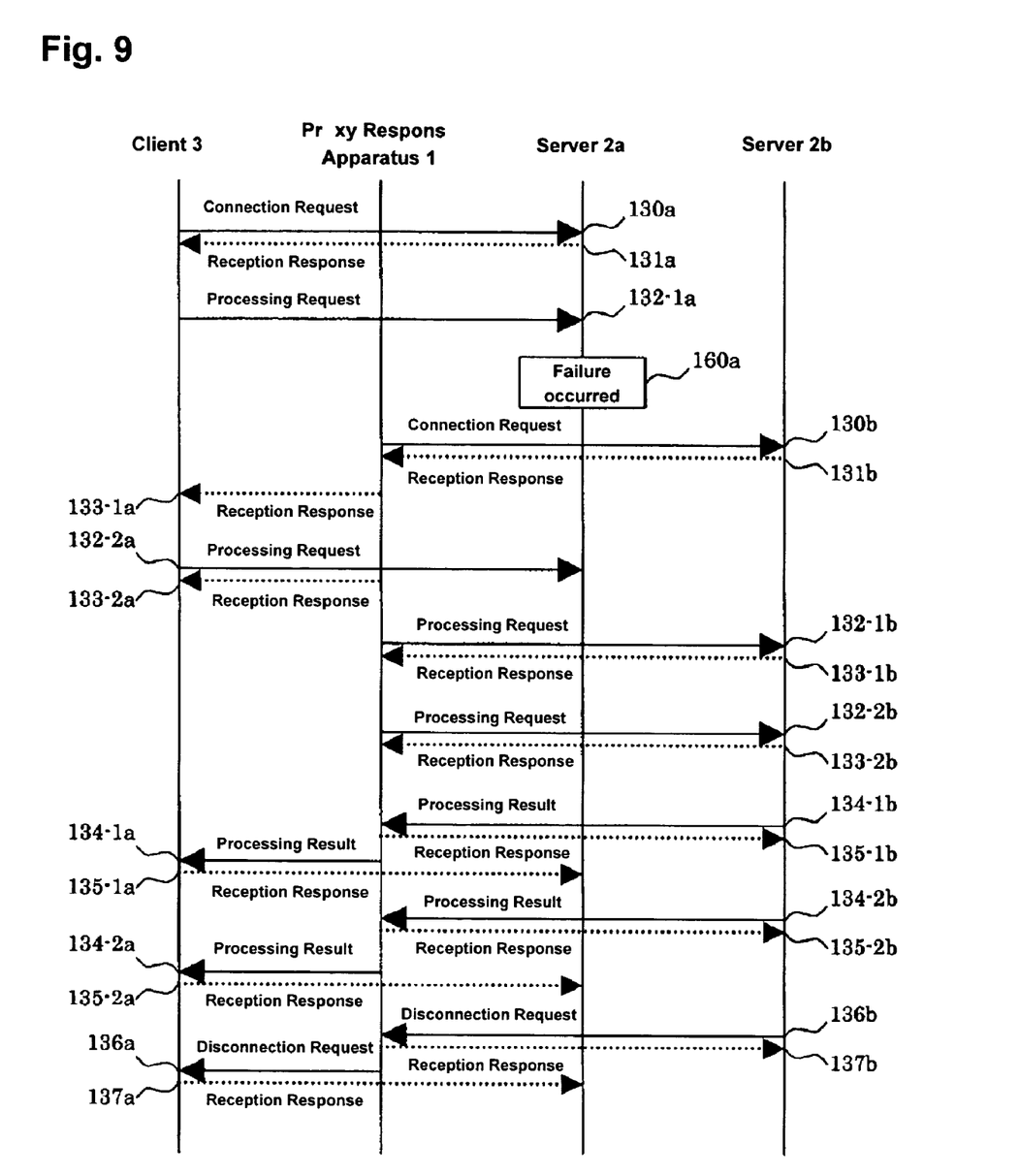
FIG. 9 shows a message flow according to the first failure example, in which a failure occurs between the client and the server.

FIG. 9 shows a message flow among the client 3, the server 2*a*, the proxy response apparatus 1 and the backup server 2*b* according to the first failure example. The proxy response apparatus 1 receives all IP packets that travel between the client 3 and the server 2*a*.

The first failure example is a situation in which a failure occurs in the server 2*a* at 160*a* after the client 3 sends the processing request 132-1*a*, and the server 2*a* is unable to respond.

The processor 100 compares the server address 113 of each entry in the packet buffer 102 with the IP address of the server 2*a*, in which the failure occurred, and looks for a session for which a proxy response must be made (step 180); if there is such a session, the processor 100 obtains the address of the server 2*b*, which is a backup for the server 2*a*, from the backup server address 122 in the server management table 103, refers to the corresponding IP packets transferred between the client 3 and server 2*a* and received by the proxy response apparatus 1, and connects to the backup server 2*b*, as indicated by a connection request 130*b* and a reception response 131*b* in FIG. 9 (step 181).

If it is determined in step 180 that there is no session for which a proxy response must be made, i.e., if a proxy response has been made for every session requiring a proxy response at the time the failure occurred but the server 2*a* has not yet recovered from the failure, the processing in step 177 is terminated.

If the proxy response apparatus 1 is already connected to the server 2*b*, step 181 is not performed.

The processor 100 checks whether reception response IP packets that correspond to all IP packets stored in the client transmission packet buffer 114 are stored in the server transmission packet buffer 115 for the session for which a proxy response must be made (step 182).

Since there is no reception response that corresponds to the processing request 132-1a according to the first failure example, the reception response 133-1a that corresponds to the processing request 132-1a is created and sent to the client 3 (step 183).

At this time, in order to make it appear to the client 3 that no failure has occurred in the server 2a, the transmission source address 151 for the IP packet in the reception response 133-1a is set to the IP address of the server 2a. The proxy response apparatus 1 does the same with the reception response 133-2a that corresponds to the processing request 132-2a.

If in step 182 no IP packets are found to be missing in the reception response, the processor 100 determines whether IP packets of a processing request message are stored in the client transmission packet buffer 114 for the session (step 184); if there is such an IP packet, the processor 100 sends the IP packet to the server 2b and deletes the IP packet from the client transmission packet buffer 114 (step 185). At this time, the transmission source address 150 and the transmission destination address 151 of the IP packet are rewritten to the IP addresses of the proxy response apparatus 1 and the server 2b, respectively. This processing is indicated by processing requests 132-1b and 132-2b in the message flow in FIG. 9.

Since requests that are equivalent to requests sent from the client 3 are sent from the proxy response apparatus 1 to the server 2b, the server 2b makes to the proxy response apparatus 1 responses that are equivalent to responses corresponding to requests from the client 3. This processing is indicated by reception responses 133-1b and 133-2b in the message flow in FIG. 9.

If it is determined in step 184 that there are no IP packets of any processing request messages, the processor 100 checks IP packets sent from the backup server 2b (step 186); if the IP packets with which the backup server 2b responded are IP packets of processing results 134-1b, 134-2b or of a disconnection request 136b, the processor 100 sends IP packets of the reception responses 135-1b, 135-2b or 137b to the server 2b (step 187).

To determine whether the IP packets of the processing results 134-1b, 134-2b have already been sent to the client 3, the processor 100 compares the packet numbers 152 of all IP packets stored in the server transmission packet buffer 115 with the packet numbers 152 of the IP packets in question (step 188); if they do not match, the processing 100 determines whether the IP packets in question are in fact for a disconnection request (step 189); if the IP packets are not for a disconnection request (i.e., if they are for processing results 134-1b and 134-2b), the processor 100 makes a proxy response and sends the IP packets to the client 3 (step 190). When making a proxy response, the transmission source address 150 and the transmission destination address 151 of the IP packets are rewritten to the IP addresses of the server 2a and the client 3, respectively, and sent as the processing results 134-1a, 134-2a.

If the packet numbers 152 of the two sets of IP packets match in step 188, the processor 100 compares the packet data 154 of the IP packets (step 191); if the packet data 154 match, the processor 100 does not do anything.

If the IP packets checked in step 189 are found to be for a disconnection request 136b, the processor 100 sends the disconnection request 136a, whose transmission source address 150 is the IP address of the server 2a, to the client 3 and deletes the session entry from the packet buffer 102 (step 192).

If the packet data 154 compared in step 191 do not match, this indicates an exceptional case in which the backup server 2b has sent a response different from a response that the server 2a would have sent. Under the circumstances, since the server 2b cannot serve as a backup for the server 2a, the session and the proxy response processing are both terminated. Furthermore, if the proxy response apparatus 1 is connected to the server 2b when this occurs, the processor 100 sends a disconnection request to the server 2b as well (step 192).

As the above description makes clear, the processor 100 executes step 180 and subsequent processing as long as the failure continues in the server 2a, and executes processing according to the situation determined in steps 182, 184 and 186.

Based on the above processing, the proxy response apparatus 1 makes a proxy response for all IP packets with which the server 2a should respond to the client 3.

Figure 10:
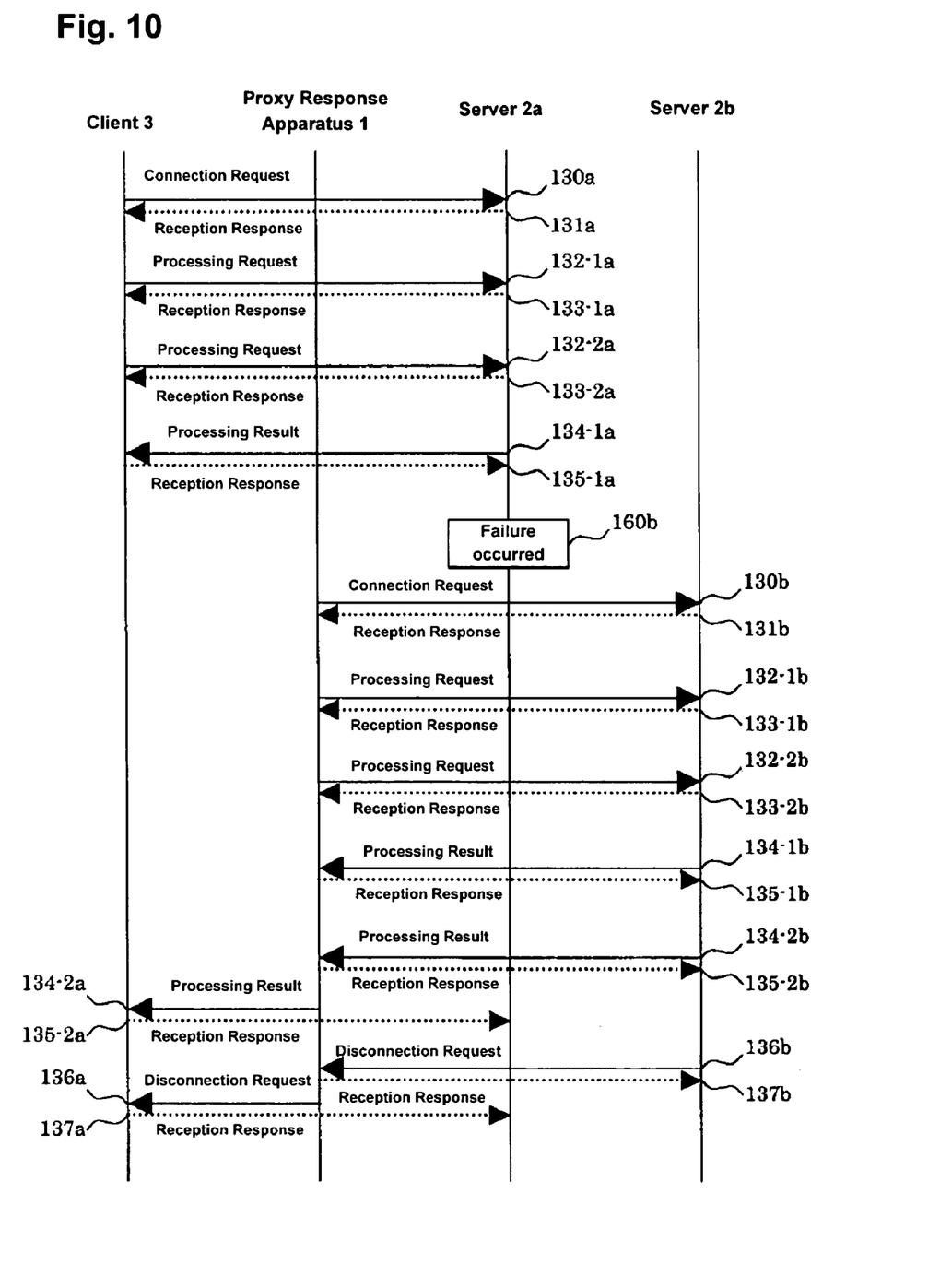
FIG. 10 shows a message flow according to the second failure example, in which a failure occurs between the client and the server

The second failure example is a situation in which a failure occurs in the server 2a at 160b after the server 2a sends the processing result 134-1a, and the server 2a is unable to respond further.

First, the relationship among IP packets that appear in the following description is described. The IP packets 132-1a and 132-2a for a request message from the client 3 and IP packets 132-1b and 132-2b used in a proxy request have the same packet data 154.

The IP packet 134-1a, which is a response message from the server 2a, and the IP packet 134-1b, which is a response message from the server 2b, have the same packet data 154.

In FIG. 10, the proxy response apparatus 1 refers to the IP packets that traveled between the client 3 and the server 2a and that have been received by the proxy response apparatus 1, and reproduces the processing up to the point the IP packet 134-1b as a response message from the server 2b is received.

Since steps 180-187 and processing for the IP packets 130a-132-2b are identical to the normal message flow and to the first failure example, the operation beginning with the point at which the processing result 134-1b is received by the proxy response apparatus 1 in FIG. 10 is explained.

Upon receiving the processing result 134-1b from the server 2b, the processor 100 determines whether the processing result 134-1b has already been sent to the client 3 (step 188).

In the second failure example, since the processing result 134-1a has already been sent to the client 3 from the server 2a, the processing result 134-1a, whose packet number is the same as that of the processing result 134-1b, is in the server transmission packet buffer 115. The processor 100 compares the packet data 154 of the two IP packets to see if they match (step 191); if they match, the processor 100 does not do anything.

Upon receiving the processing result 134-2b from the server 2b, the processor 100 performs the same processing as in the first failure example, since this packet does not exist in the server transmission packet buffer 115.

The subsequent processing is the same as in the first failure example, such that the proxy response apparatus 1 can perform also in the second failure example a proxy response for all IP packets with which the server 2a should respond to the client 3.

Lastly, referring to FIG. 11, the operation of the entire system shown in FIG. 1 will be described with respect to a series of its states in a cycle from a normal state to an occurrence of failure, a proxy response, a recovery from failure, and returning to the normal state.

Figure 11:
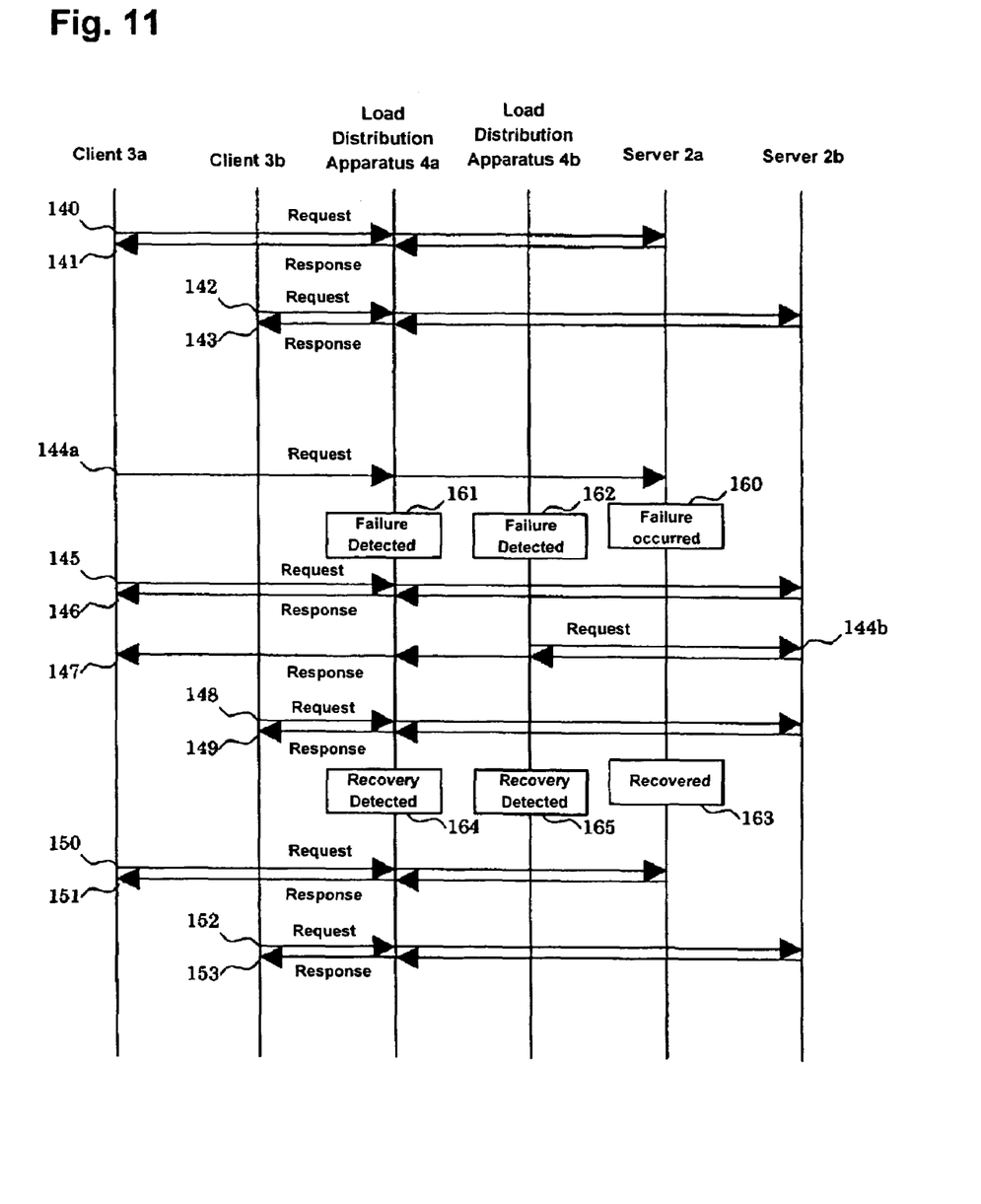
FIG. 11 shows a message flow from the occurrence of a failure to recovery within a network system to which the proxy response apparatus is applied.

FIG. 11 shows a message flow according to the cycle. Each arrow represents, unlike the arrows in FIGS. 6, 9 and 10, one request message or one response message comprising a plurality of IP packets.

In the normal state, request messages 140 and 142 sent from clients 3a, 3b are first sent to the load distributing apparatus 4a, and then sent to the server 2a or the server 2b so that the load on both servers is generally the same. A response 141 and a response 142 in response to the request messages 140 and 142 are sent to the clients 3a, 3b via the load distributing apparatus 4a.

Let us assume that immediately after a request 144a is sent to the server 2a, a failure 160 occurs in the server 2a.

As described above, since each arrow represents an independent message and does not represent a single packet with a certain order, the client 3a may send a request 145 even if it has not received any response to the request 144a.

Upon detecting the failure at 161, the load distributing apparatus 4a sends the next request 145 sent from the client 3a to the server 2b, which has not had any failures. A response 146 corresponding to the request 145 is sent to the client 3a from the server 2b via the load distributing apparatus 4a.

Upon detecting the failure at 162, the proxy response apparatus 1 in place of the client 3a sends to the server 2b a request 144b, whose content is identical to that of the request 144a, in place of the request 144a for which the server 2a has not responded to the client 3a due to the occurrence of failure at 160, and pretends to be the server 2a and sends a response 147 to the client 3a.

While the failure continues, the load distributing apparatus 4a also sends a next request 148 from the client 3b to the server 2b and sends its corresponding response 149 to the client 3b. As a result, although load cannot be distributed, requests from the client 3a and 3b are definitely processed.

The processing by the load distributing apparatus 4a and the processing by the proxy response apparatus 1 can take place in parallel or in any arbitrary order.

In this way, while the load distributing apparatus 4a detects an occurrence of failure and switches the server for processing requests from the clients 3a and 3b from the server 2a to the server 2b, the proxy response apparatus 1 performs processings similar to those described above for all requests for which the server 2a has not responded.

Subsequently, when the server 2a recovers from the failure at 163, the load distributing apparatus 4a and the proxy response apparatus 1 detect the recovery at 164 and 165, respectively, and the normal processing is resumed. Subsequent messages 150-153 are processed normally like the messages 141-143, and loads from the messages are distributed.

According to the present invention, a cluster method, client/server type system with both availability and scalability can be provided.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A proxy response apparatus connected to a client and a first and second server through a communications network, the proxy response apparatus comprising:
    a monitoring module that monitors occurrence of a failure in the first server that is processing request messages from the client;
    a storing module that obtains packets composing a request message and a corresponding response message that are exchanged between the first server and the client from the communications network and stores the packets until receiving a disconnection request packet; and
    a managing module that refers the packets that are stored by the storing module when said monitoring module detects occurrence of a failure in the first server, obtains a response packet that has not been sent to the client from the second server, and sends the response packet to the client.

2. A proxy response apparatus according to claim 1, wherein the managing module comprises a module that receives a new request packet from the client and sends the new request packet to the second server without having a failure.

3. A proxy response apparatus according to claim 2, wherein the managing module comprises a module that receives a response packet corresponding to the new request packet from the second server without having a failure, and sends the response packet to the client.

4. A proxy response apparatus according to claim 3, wherein the managing module comprises a module that sends to the second server without having a failure a request packet which has been sent from the client but has not been responded by the first server, and a module that receives from the second server without having a failure a response packet corresponding to the request packet and sends the response packet to the client.

5. A proxy response apparatus according to claim 3, wherein the managing module rewrites a transmission source address of the response packet to an address of the first server that has a failure, and sends the response packet to the second server.

6. A proxy response apparatus according to claim 5, further comprising a storage module that stores addresses of the first and second servers, wherein the transmission source address of the response packet is found by referring to the addresses of the first and second servers stored in the storage module.

7. A proxy response apparatus according to claim 4, wherein the module that sends to the second server without having a failure the request packet which has not been responded rewrites a transmission source address of the request packet to an address of the proxy response apparatus, and sends the request packet to the second server without having a failure.

8. A proxy response apparatus according to claim 1, further comprising an obtaining and accumulating module that obtains and accumulates packets exchanged between the client and the first and second servers, and a restoring module that, when the monitoring module that monitors occurrence of a failure detects occurrence of a failure in the first server, uses the packets accumulated in the obtaining and accumulating module to restore a state of the first server of at the time of occurrence of the failure with the second server without having a failure.

9. A proxy response apparatus according to claim 8, wherein the restoring module comprises:
    a module that, when the failure is detected in the first server, rewrites a transmission destination address of packets that have been transmitted from the client among the packets accumulated in the obtaining and accumulating module to an address of the second server without having a failure, and sends the packets to the second server without having a failure;

a module that receives a response packet sent from the second server without having a failure; and a recognition module that recognizes, among the plurality of response packets, packets that have been already sent from the first server that has the failure to the client.

10. A network system having one client and a first and second server connected via a communications network, the network system comprising:

at least one load distribution device connected to the first and second servers; and a proxy response apparatus that, when a failure occurs in the first server that is processing a request message sent from the client, makes the second server without having a failure continue processing the request message, and sends to the client response packets that are results of processing the request message executed by the second server, wherein the at least one load distribution device comprises a module that, when the failure occurs in the first server that is processing the request message sent from at least one client, makes the second server without having a failure process a new request message sent from the client, the proxy response apparatus comprises:

a monitoring module that monitors occurrence of a failure in the first server;

a storing module that obtains packets composing a request message and a corresponding response message that are exchanged between the first server and the client and stores the packets until receiving a disconnection request packet; and a managing module that refers the packets that are stored by the storing module when a failure is detected by the monitoring module in the first server, obtains a response packet that has not been sent to the client from the second server without having a failure, and sends the response packet to the client, wherein the managing module that obtains the response packet rewrites a transmission source destination of the request message to an address of the proxy response apparatus.

11. A network system having a client and a first and second server connected via a communications network, the network system comprising:

a proxy response apparatus that, when a failure occurs in the first server that is processing a request message sent from the client, makes the second server without having a failure continue processing the request message, and sends to the client a response packet that is a result of processing the request message executed by the second server;

at least one load distribution device that, when the failure occurs in the first server that is processing the request message sent from the client, makes the second server without having a failure process a new request message sent from the client.

12. A network system according to claim 11, wherein the proxy response apparatus comprises:

a monitoring module that monitors occurrence of a failure in the first and second servers;

a storing module that obtains packets composing a request message and a corresponding response message that are exchanged between the first and second servers and the client and stores the packets until receiving a disconnection request packet; and a managing module that refers the packets are stored by the storing module when said monitoring module detects occurrence of a failure in the first server, obtains a response packet that has not been sent to the client from the second server without having a failure, and sends the response packet to the client.

13. A method for operating a proxy response apparatus that is connected to a client and a first and second server through a communications network, the method comprising the steps of:

monitoring occurrence of a failure in the first server that is processing request messages from the client;

obtaining from the communications network packets composing a request message and a corresponding response message that are exchanged between the first server and the client and storing the packets; and operating the proxy response apparatus to obtain, when occurrence of a failure in the first and second servers is detected, a response packet that has not been sent to the client from the second server without having a failure, and send the response packet to the client.

14. A method for operating a proxy response apparatus according to claim 13, wherein the step of operating the proxy response apparatus includes the steps of receiving a new request packet from the client, and sending the new request packet to the first and second servers without having a failure.

15. A method for operating a proxy response apparatus according to claim 13, wherein the step of operating the proxy response apparatus includes the steps of receiving a response packet corresponding to the new request packet from the second server without having a failure, and sending the response packet to the client.

16. A method for operating a proxy response apparatus according to claim 15, wherein the step of operating the proxy response apparatus includes the steps of sending to the second server without having a failure a request packet which has been sent from the client but has not been responded by the first server, and receiving from the second server without having a failure a response packet corresponding to the request packet and sending the response packet to the client.

17. A method for operating a proxy response apparatus according to claim 15, wherein the step of operating the proxy response apparatus includes the steps of rewriting a transmission source address of the response packet to an address of the second server that has the failure, and sending the response packet to the second server.

18. A method for operating a proxy response apparatus according to claim 17, further comprising the steps of storing addresses of the first and second servers, wherein the transmission source address of the response packet is found by referring to the addresses of the first and second servers stored in the storage module.

19. A method for operating a proxy response apparatus according to claim 16, wherein the step of sending to the second server without having a failure the request packet which has not been responded includes the steps of rewriting a transmission source address of the request packet to an address of the proxy response apparatus, and sending the request packet to the second server without having a failure.

20. A method for operating a proxy response apparatus according to claim 13, further comprising the steps of:

obtaining and accumulating packets exchanged between the client and the first and second servers, and when the module that monitors occurrence of a failure detects occurrence of a failure in the first server; and restoring a state of the first server at the time of occurrence of the failure with the second server without having a failure by using the packets accumulated.

21. A method for operating a proxy response apparatus according to claim 20, wherein the step of restoring comprises the steps of:

when the failure is detected in the first server, rewriting a transmission destination address of packets that have been transmitted from the client among the packets accumulated to an address of the second server without having a failure, and sending the packets to the second server without having a failure;

receiving response packets sent from the second server without having a failure; and recognizing, among the response packets, packets that have been already sent from the first server that has the failure to the client.

* * * * *